No. 654,051. Patented July 17, 1900.
R. P. BROWN & A. SCHAUSTEN.
TRIPOD.
(Application filed Dec. 26, 1899.)
(No Model.)
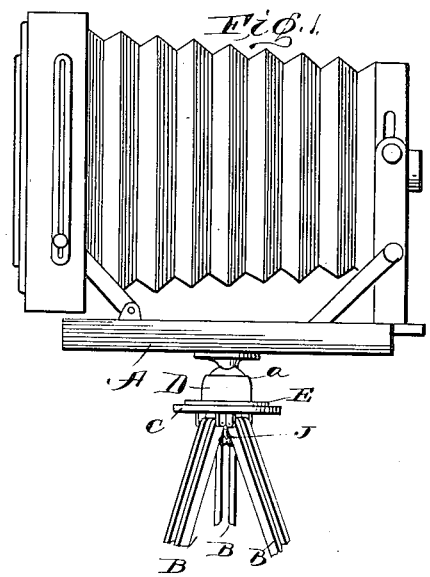
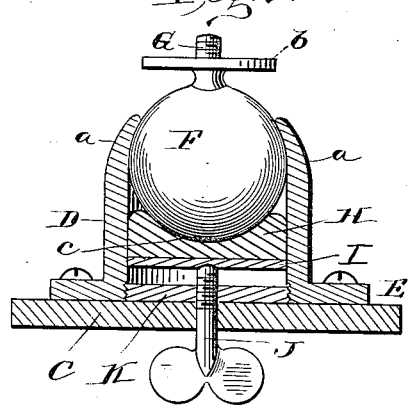
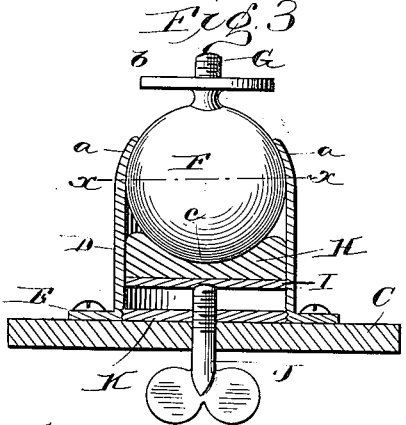
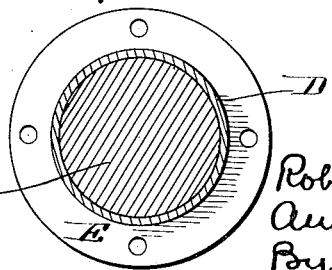
Witnesses:
J. M. Fowler Jr.
T. J. Stilson
Inventor
Robert P. Brown and
August Schausten,
By Wm. E. Dyre.
Attorney

UNITED STATES PATENT OFFICE.

ROBERT P. BROWN AND AUGUST SCHAUSTEN, OF WASHINGTON, DISTRICT OF COLUMBIA.

TRIPOD.

SPECIFICATION forming part of Letters Patent No. 654,051, dated July 17, 1900.

Application filed December 26, 1899. Serial No. 741,646. (No model.)

*To all whom it may concern:*

Be it known that we, ROBERT P. BROWN and AUGUST SCHAUSTEN, citizens of the United States, residing at Washington, in the District of Columbia, have invented certain new and useful Improvements in Tripods; and we do hereby declare the following to be a full, clear, and exact description of the invention, such as will enable others skilled in the art to which it appertains to make and use the same.

Our invention relates, primarily, to the art of photography, but has more particular reference to certain novel improvements in the construction of tripods for the support of cameras. Its use also contemplates the similar support of theodolites, compasses, surveying instruments, telescopes, and astronomical implements in general or other instruments of precision requiring either nicety or range of adjustment to or from a horizontal plane.

The chief object of the present invention may accordingly be said to reside in means for securely mounting a photographic camera upon its supporting-tripod and rendering it independently adjustable thereon to any required angle of inclination.

As a further object our invention contemplates and provides for the peculiar form of construction, arrangement, and combination of parts hereinafter set forth for obtaining the aforesaid results with accuracy, rapidity, and precision, a construction at once simple, inexpensive, and durable, easy of manipulation and remarkably efficient in securing and maintaining what may be termed a "universal adjustment" of the camera upon its tripod as a fixed point of support.

As well known by all persons skilled in the art of photography, preservation of the rectilinear lines of a picture is a matter of the greatest importance. This must always be accomplished at the outstart by adjustment of the camera with relation to the subject to be photographed. Heretofore such adjustment has usually been effected by manipulation of the tripod or one leg thereof, the process being both laborious and unreliable, owing, among other reasons, to irregularities of the earth as a support for the tripod or to space-limitations if the picture is an interior one. To overcome these and kindred difficulties, our present improved construction of universally-adjustable tripod-head has been devised and produced in manner and form as will be hereinafter described, and particularly pointed out in the claims following.

In the accompanying drawings, which form part of this specification, and whereon like letters of reference indicate corresponding parts in the several views, Figure 1 is a side elevation of our invention in operative position, showing its relative position between the head of a tripod and base of a camera. Fig. 2 is a vertical central section of the invention attached to the head of a tripod. Fig. 3 is a view corresponding with Fig. 2, with the exception that a sheet or pressed-metal form is here shown; and Fig. 4 is a horizontal section of the invention, taken on the line $x\,x$, Fig. 3.

Reference being had to the drawings and letters thereon, A indicates a photographic camera, B B B the legs or standards of a supporting-tripod therefor, and C a cap or top plate to which legs B are pivotally connected in the usual manner.

Upon the surface of top plate C is mounted a universally-adjustable tripod-head which embodies the important and controlling features of the present invention, constituting a ball-and-socket connection between the bed of the camera and the top plate aforesaid.

D indicates the fixed or socket member of the invention, which is substantially cylindrical in form and open at both ends. This member is surrounded by a base-flange E, whereby it is secured to top plate C of the tripod, and the upper edge of its walls converge, as at $a$, for purposes that will later appear.

Within the confines of socket D is held a ball F, surmounted by a bracket $b$ and a central screw-stud G for detachable connection with the bed of a camera. By preference ball F is a true sphere and is made of cast metal, either solid or hollow; but obviously the material, as also the precise configuration of this member, may be varied to meet special requirements so long as the features essential to its coöperation with socket D are preserved.

Beneath ball F and within the cylindrical casing or socket D is a vertically-adjustable friction-shoe H, which may be formed of any suitable material—such as cork, leather, papier-mâché, soft wood, or other more or less yielding material—and having a concave upper surface c. Shoe H is supported directly upon a vertically-movable disk or wear-plate I, and this in turn rests upon the end of a binding-screw J for the purpose of firmly binding ball F between the shoe aforesaid and the converging walls a of socket D, thus locking it in a predetermined position against accidental rotation. This locking-screw J is supported in threaded relation with a closure K, threaded into the lower, otherwise open, end of socket D, as shown by Figs. 2 and 3, and it will be noted that said screw is accordingly so positioned as to be most accessible to the operator beneath the center of top plate C and between the legs B B B of the tripod. Thus the screw may be operated by a sense of touch alone, its mechanical action and that of the correlative parts being at all times such as to permit an immediate adjustment of the camera and a positive locking thereof in its adjusted position.

Special advantages are claimed for the direct vertical action of the movable parts of the invention, and it will be observed that the binding force exerted by screw J upon ball F is always applied in direct vertical lines and the strains incident thereto advantageously distributed.

This being a description of the invention, its use and action are so apparent as to require no further statement of operation. Its advantages are equally apparent to all persons skilled in photography and arts related thereto, and while the preferred form of construction and materials have been herein set forth it should be noted that we by no means limit ourselves to the precise construction and arrangement of parts shown and described, since various modified means may be employed for accomplishing the same results without departing from the spirit of our invention.

Having thus described our improvements, what we claim, and desire to secure by Letters-Patent, is—

1. A universally-adjustable tripod-head comprising a ball member bearing a screw-stud for mounting a camera, a socket for containing the ball member, a removable closure for the lower end of the socket member, and a binding-screw in threaded relation with said closure operating upon the ball member for maintaining a predetermined adjustment thereof, substantially as described.

2. A universally-adjustable tripod-head comprising a ball member bearing a screw-stud for mounting a camera, a cylindrical socket converging at one end and flanged at its opposite for containing the ball member, a screw-closure for the lower end of the socket member, a binding-screw in threaded relation with said closure, and a friction-shoe interposed between said screw and ball for maintaining a predetermined adjustment of the latter, substantially as described.

In testimony whereof we subscribe our signatures in presence of two witnesses.

ROBERT P. BROWN.
AUGUST SCHAUSTEN.

Witnesses:
WM. E. DYRE,
HUGH M. STERLING.